(12) United States Patent
Livaccari et al.

(10) Patent No.: US 10,289,098 B2
(45) Date of Patent: May 14, 2019

(54) DYNAMIC FOOTWEAR CUSHIONING SYSTEM

(71) Applicant: LENOVO ENTERPRISE SOLUTIONS (SINGAPORE) PTE. LTD., Singapore (SG)

(72) Inventors: Steven J. Livaccari, Wake Forest, NC (US); William M. Megarity, Raleigh, NC (US); Eric A. Stegner, Cary, NC (US); Robert W. Stegner, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 264 days.

(21) Appl. No.: 15/160,442

(22) Filed: May 20, 2016

(65) Prior Publication Data
US 2017/0336781 A1   Nov. 23, 2017

(51) Int. Cl.
G05B 19/404 (2006.01)
A43B 3/00 (2006.01)
A43B 13/18 (2006.01)
G05B 19/4155 (2006.01)

(52) U.S. Cl.
CPC ........ *G05B 19/4155* (2013.01); *A43B 3/0005* (2013.01); *A43B 13/186* (2013.01); *G05B 19/404* (2013.01); *G05B 2219/45243* (2013.01)

(58) Field of Classification Search
CPC .......................... G05B 19/4155; A43B 3/0005
USPC ......................................................... 700/275
See application file for complete search history.

(56) References Cited

U.S. PATENT DOCUMENTS

| | | | | |
|---|---|---|---|---|
| 7,225,565 B2* | 6/2007 | DiBenedetto | ........ | A43B 1/0009 36/132 |
| 8,059,000 B2* | 11/2011 | Ishikawa | ............. | A41D 13/018 2/455 |

OTHER PUBLICATIONS

"Adidas Launches the Intelligent Running Shoe", gizmag.com (online), accessed Feb. 11, 2016, 4 pages, URL: http://www.gizmag.com/adidas-launches-the-intelligent-running-shoe/2810/.
"Lenovo demos new smart shoes with a screen that displays your mood", venturebeat.com (online), May 28, 2015, 5 pages, URL: http://venturebeat.com/2015/05/28/lenovo-demos-new-smart-shoes-with-a-screen-that-displays-your-mood.
Gonzalez, "These shoes are made for walking . . . and a lot more!", wearable-technologies.com (online), Nov. 14, 2014, 6 pages, URL: https://www.wearable-technologies.com/2014/11/these-shoes-are-made-for-walking-and-a-lot-more/.
McCarthy, "Adidas puts computer on new footing", usatoday.com (online), Mar. 2, 2005, 2 pages, URL: http://usatoday30.usatoday.com/money/industries/2005-03-02-smart-usat_x.htm.

* cited by examiner

*Primary Examiner* — Michael Rutland Wallis

(57) ABSTRACT

Disclosed are embodiments for a dynamic footwear cushioning system. One example embodiment includes: setting a cushioning level for cushioning material in accordance with a first setting; and altering, in dependence upon an environmental condition change, the cushioning level for the cushioning material in accordance with a second setting.

9 Claims, 8 Drawing Sheets

2

DYNAMIC FOOTWEAR CUSHIONING SYSTEM

BACKGROUND

Field of the Invention

The field of the invention is data processing, or, more specifically, methods, apparatus, and computer program products for a dynamic footwear cushioning system.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago. One area of advancement includes embedded devices that control various consumer goods, including footwear. However, footwear solutions have been overly simplistic.

SUMMARY

Disclosed are embodiments for a dynamic footwear cushioning system. One embodiment includes: setting a cushioning level for cushioning material in accordance with a first setting; and altering, in dependence upon an environmental condition change, the cushioning level for the cushioning material in accordance with a second setting.

The foregoing and other features, aspects, and details are described in the Detailed Description, and as illustrated in the accompanying drawings, where like reference numbers generally represent like parts of the disclosed embodiments.

DETAILED DESCRIPTION

Embodiments of methods, apparatus, and computer program products for a dynamic footwear cushioning system are described with reference to the accompanying drawings, beginning with FIG. 1.

Figure 1:
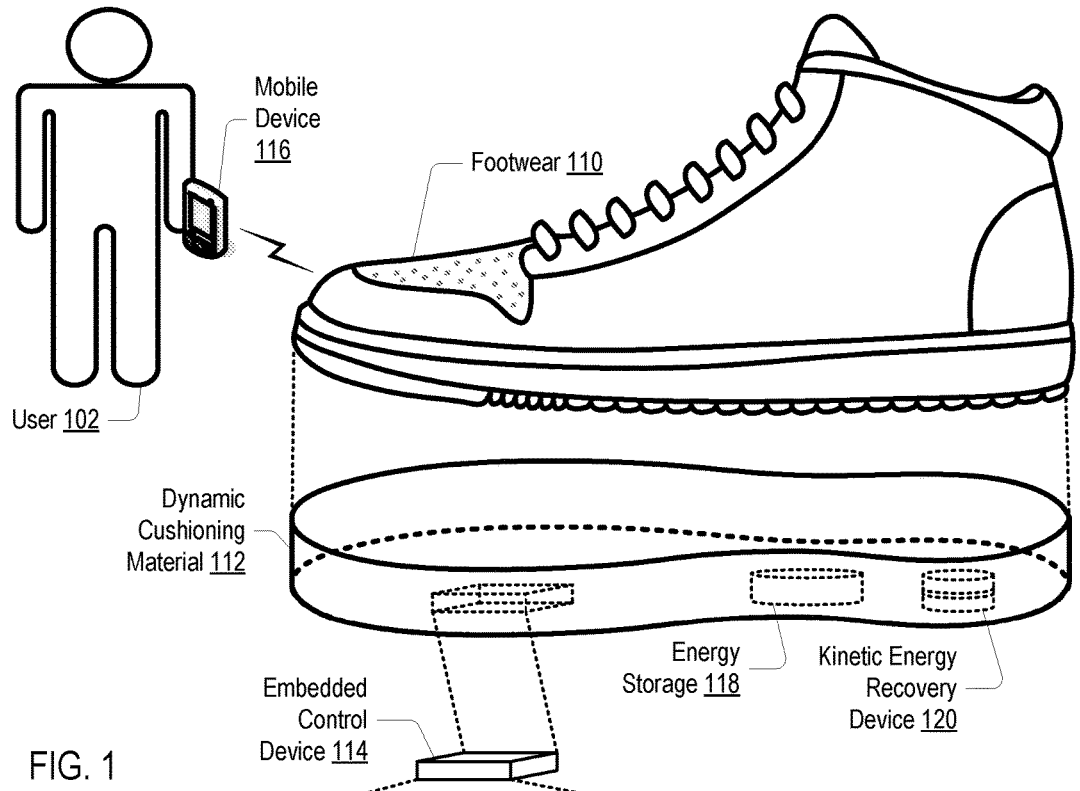
FIG. 1 illustrates a shoe configured for a dynamic footwear cushioning system according to an embodiment.
Figure 1:
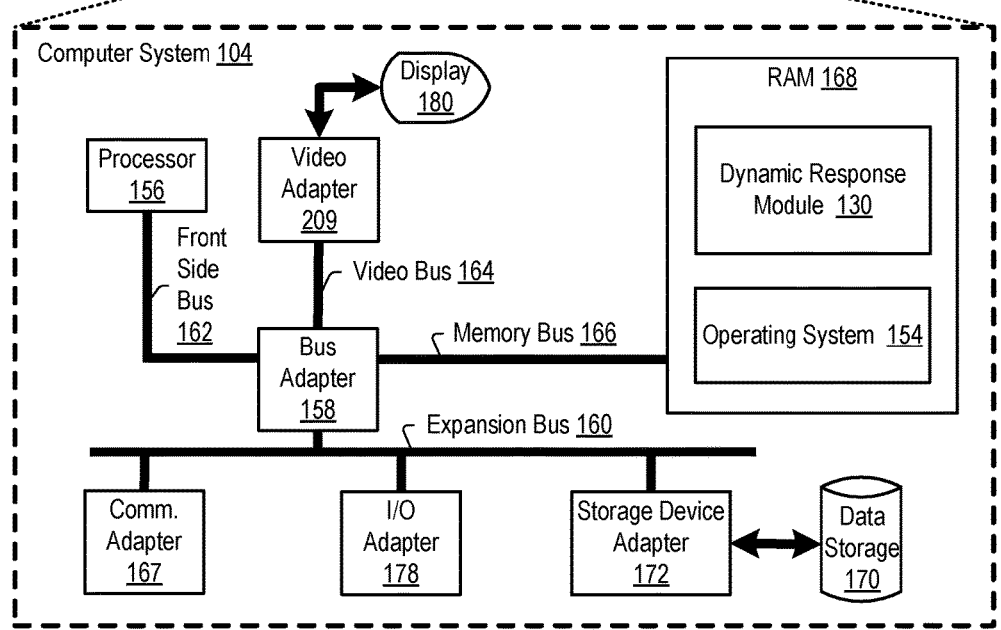

Turning now to FIG. 1, an embedded control device (114) of footwear (110) includes a computer system (104) implementing dynamic response module (130) that may be configured for a dynamic footwear cushioning system.

The embedded control device (114) within footwear (110) for user (102) may control physical characteristics of the dynamic cushioning material (112), including modifying a level of cushioning for one or more regions of the dynamic cushioning material (112). A level of cushioning may be set to a firm cushioning for soft surfaces such as sand, gravel, or running tracks, or the level of cushioning may be set to a less firm, or soft, cushioning for harder surfaces such as concrete. Further, the cushioning material may include a region for a heel area, an arch area, or a foot pad area, where a particular setting for a cushioning level may specify different cushioning for different regions of the cushioning material.

The embedded control device (114) within footwear (110) for user (102) may also wirelessly communicate with a mobile device (116) to receive user inputs and other information. For example, the mobile device (116) may provide GPS data, map data, route information, terrain data, weather information, velocity, or other sensor data. The mobile device (116) may also provide the embedded control device (114) with information received through a user interface of an application installed on the mobile device (116). While depicted as a mobile telephone in FIG. 1, generally, the mobile device (116) may include any mobile computing device, including a smart watch, a wearable fitness device, among others.

The footwear (110) also includes a kinetic energy recovery device (120) and an energy storage (118) component. The kinetic energy recovery device (120) may convert kinetic energy from user movement such as walking or running into electrical energy stored within the energy storage (118) component. The energy storage (118) component may be a rechargeable battery or a capacitor that receives electrical energy from the kinetic energy recovery device (120) and provides the electrical energy to the embedded control device (114).

A dynamic footwear cushioning system is generally implemented with computers, that is, with automated computing machinery. In the computer system of FIG. 1, for example, the computer system (104) may be implemented using one or more computer hardware processors. For further explanation, therefore, FIG. 1 illustrates a block diagram of automated computing machinery comprising an embodiment of a computer system (104) configured for dynamic footwear cushioning system. The computer system (104) includes at least one computer processor (156) or "CPU" as well as random access memory (168) or "RAM," which is connected through a high speed memory bus (166) and bus adapter (158) to processor (156) and to other components of the computer system (104).

Stored in RAM (168) is a network management module dynamic response module (130), a module of computer program instructions improved for a dynamic footwear cushioning system according to various embodiments. The dynamic response module (130) for example may, when executed, cause the embedded control device (114) to carry out the steps of: determining, in dependence upon one or more environmental conditions, a first setting for a cushioning material for a shoe; setting the cushioning material in accordance with the first setting; determining, in dependence upon an environmental condition change among the one or more environmental conditions, a second setting for the cushioning material; and setting the cushioning material in accordance with the second setting.

Also stored in RAM (168) is an operating system (154). Operating systems useful in computers configured for a dynamic footwear cushioning system according to various embodiments include UNIX™, Linux™, Microsoft XP™, AIX™, IBM's i5/OS™, and others as will occur to those of skill in the art. The operating system (154) and network management module (130) are shown in RAM (168), but many components of such software may typically be stored in non-volatile memory such as, for example, on a data storage (170) device.

The computer system (104) may also include a storage device adapter (172) coupled through expansion bus (160) and bus adapter (158) to processor (156) and other components of the computer system (104). Storage device adapter (172) connects non-volatile data storage to the computer system (104) in the form of data storage (170). Storage device adapters useful in computers configured for a dynamic footwear cushioning system according to various embodiments include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computer system (104) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computer system (104) may also include a video adapter (209), which may be an example of an I/O adapter specially designed for graphic output to a display device (180) such as a display screen or computer monitor. Video adapter (209) may be connected to processor (156) through a high speed video bus (164), bus adapter (158), and the front side bus (162), which may also be a high speed bus.

The computer system (104) may also include a communications adapter (167) for data communications with other computers or devices, including mobile device (116), and for data communications with a data communications network. Such data communications may be carried out serially through RS-232 connections, through external buses such as a Universal Serial Bus ("USB"), through data communications networks such as IP data communications networks, and in other ways as will occur to those of skill in the art. Communications adapters may implement the hardware level of data communications through which one computer sends data communications to another computer, directly or through a data communications network. Examples of communications adapters useful in computers configured for a dynamic footwear cushioning system according to various embodiments include Ethernet (IEEE 802.3) adapters for wired data communications and 802.11 adapters for wireless data communications.

Figure 2:
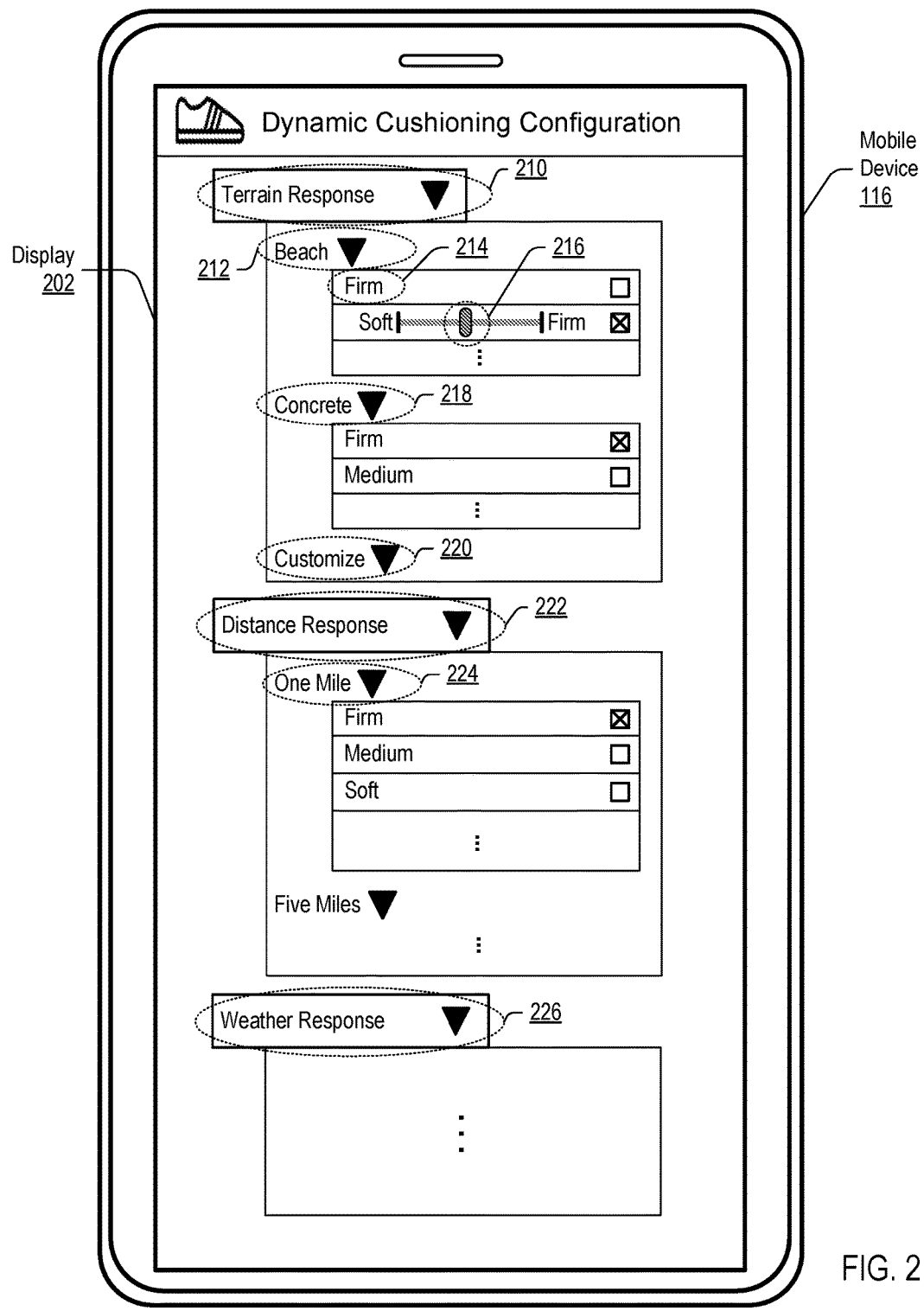
FIG. 2 illustrates a user interface of an application installed on a mobile device, where the application is in communication with an embedded control device of the dynamic footwear cushioning system according to an embodiment.

Turning now to FIG. 2, illustrated is a user interface of an application installed on the mobile device (116), where the application is in communication with the embedded control device (114) of the dynamic footwear cushioning system.

Generally, the dynamic footwear cushioning system may operate with default settings, and without any communication with a paired application on a mobile device. However, the paired application may allow a user to set custom settings, or to override default settings, for how the dynamic footwear cushioning system responds to environmental, physical, or temporal conditions or changes.

The application user interface, displayed within display (202), may include a drop down menu user interface element, terrain response (210), for modifying responses to terrain changes, a drop down menu user interface element, distance response (222), for modifying responses to distances traveled, and a drop down menu user interface element, weather response (226), for modifying responses to weather conditions. While in this example, a user specifies cushioning level preferences, in other examples, a user may also specify lace tightness adjustments that may correspond with each of the different user interface drop down menus.

The terrain response (210) user interface element may provide a user with several selectable settings, including a response to a change in cushioning level when a user is moving on a beach, as indicated by the beach (212) user interface element—where a cushioning level in response to moving on a beach may be firm (214), or a cushioning level may correspond to a slider position located along a spectrum of "Soft" and "Firm," as depicted by slider button (216). Similarly, a user may specify a cushioning level when the terrain is concrete, as indicated by the concrete (218) user interface element. Generally, a user may use the customize (220) user interface element to specify other types of terrains and corresponding setting for cushioning levels. Further, the application may respond to voice commands to allow a user to command the application to modify a cushioning level according to a cushioning level vocalized in the voice command—without the user manipulating the user interface of the application.

The distance response (222) user interface element may provide a user with several selectable settings, including a response to change a cushioning level after a user has been detected to be moving for a particular distance. For example, a user may specify through user interface element (224) that after a user has moved one mile from a starting location, or from a reference location, that the cushioning level should become firm, or some other cushioning level. Similarly, for other distances from a reference location, a user may specify corresponding changes in cushioning levels.

The weather response (226) user interface element may provide a user with selectable settings, including a response to a change in a cushioning level corresponding to different types of weather or temperatures. For example, a user may set a firm cushioning level if the temperature is over 90 degrees Fahrenheit, or the user may set a medium cushioning level if the temperature is below 50 degree Fahrenheit. Similarly, a user may set different cushioning levels to correspond to different types of weather, such as rain, low humidity, or other types of weather.

In other examples, a user may specify a user interface element (not shown) corresponding to a type of physical activity, such as a marathon, where the dynamic footwear cushioning system may set cushioning levels corresponding to different points along the 26.2 mile distance, where the changes in cushioning levels may adjust gradually, or between discrete cushioning levels. Similarly, a user may specify a type of sport, such as tennis, soccer, or racquetball without specifically specifying a cushioning level.

Figure 3:
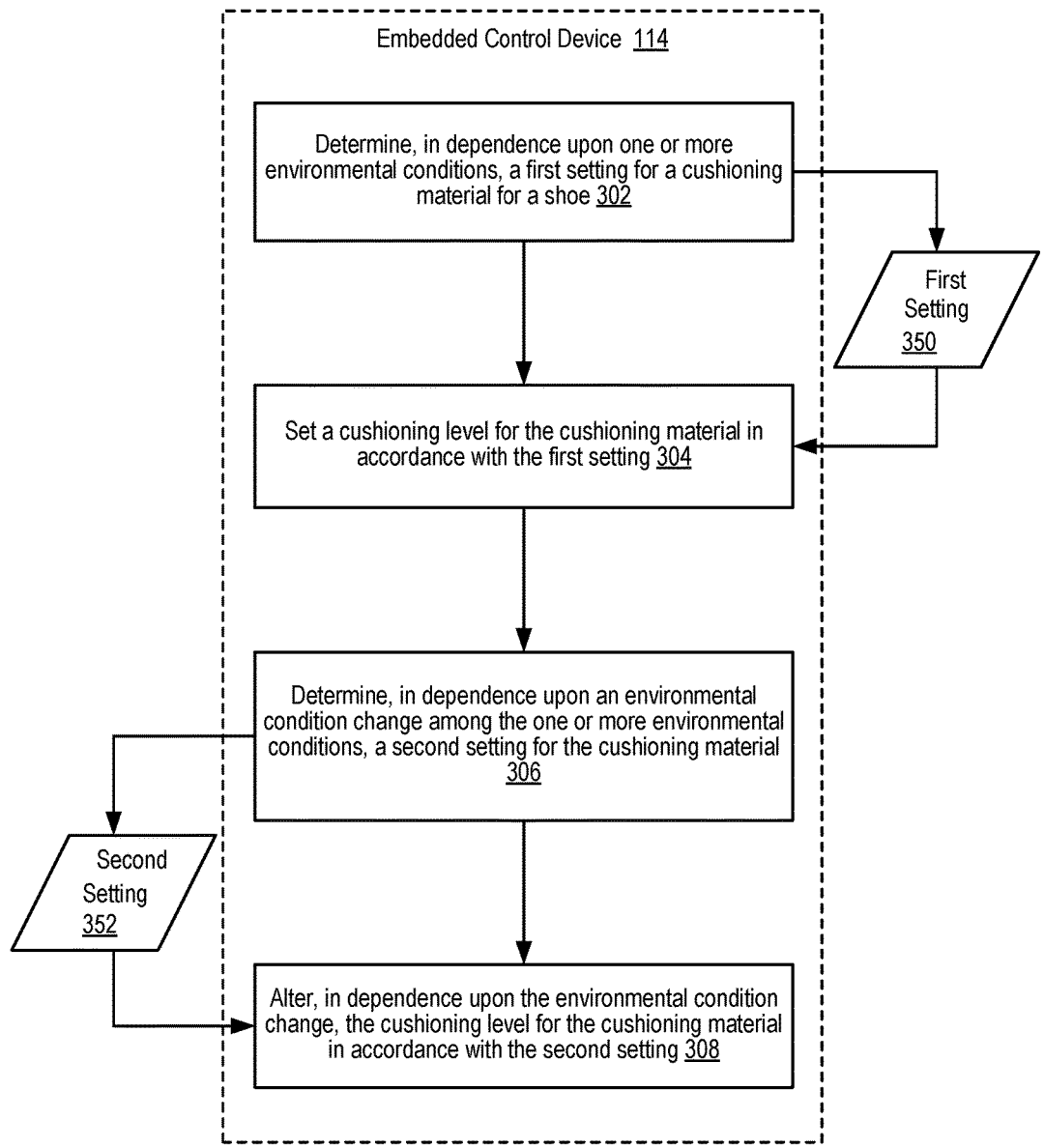
FIG. 3 depicts a flow chart illustrating an embodiment of a method for a dynamic footwear cushioning system according to an embodiment.

For further explanation, FIG. 3 depicts a flow chart illustrating an embodiment of a method for a dynamic footwear cushioning system. The dynamic footwear cushioning system may be carried out by the embedded control device (114) of footwear (110), where the embedded control device (114) includes a computer system (104) implementing a dynamic response module (130) that may be configured for the dynamic footwear cushioning system.

The method of FIG. 3 includes determining (302), in dependence upon one or more environmental conditions, a first setting (350) for a cushioning material for a shoe. Determining (302) the first setting may be carried out by the embedded control device (114) wirelessly requesting map data from a server, where the request from the embedded control device (114) may include GPS coordinates for a current location for the shoe as indicated by a GPS receiver embedded within the shoe. The server, in response to the request, may provide map data that includes information for the map region surrounding the GPS coordinates. The map data may include environmental condition information indicating that the GPS coordinates correspond to a street, sidewalk, inside of a building, in a park, on a beach, on a hiking trail, or some other type of environmental information or condition.

The embedded control device (114), to determine the first setting, may then access a stored table that maps different types of environmental conditions, including terrain information, with different cushioning levels appropriate for the environmental condition or terrain. The embedded control device (114) may then define the first setting in dependence upon a cushioning level mapped to the one or more of the environmental conditions. While this example describes a GPS received embedded within the shoe, in other examples, the embedded control device (114) may communicate with a mobile device (116) to request map data, where the mobile device (116), in response to receiving the request from the embedded control device (114), requests GPS data from a server for current GPS coordinates as indicated by a GPS received within the mobile device (116).

The method of FIG. 3 also includes setting (304) a cushioning level for the cushioning material in accordance with the first setting. Setting (304) the cushioning level for the cushioning material may be carried out by the embedded control device (114) generating a control signal indicating an inflation level that corresponds to a cushioning level. For example, the cushioning material may include a plurality of inflatable pockets dispersed throughout the cushioning material, where each pocket may be inflated to different levels of pounds per square inch, or a PSI level, and where a firm cushioning level setting may correspond to a high PSI level, and a soft cushioning level may correspond to a low PSI level. In other cases, the cushioning material may be a substance that reacts differently to different levels of applied voltage levels, where the cushioning material, when provided with a high voltage reacts by becoming stiffer, and where the cushioning material, when provided with a low voltage reacts by becoming softer. In other examples, different types of cushioning material that is adjustable according to different inputs may be used, where the embedded control device (114) may map inputs to the cushioning material to different settings for cushioning levels.

The method of FIG. 3 also includes determining (306), in dependence upon an environmental condition change among the one or more environmental conditions, a second setting (352) for the cushioning material. Determining (306) the second setting may be carried out by the embedded control device (114) periodically, or aperiodically, requesting map data from a server, where the request from the embedded control device (114) include GPS coordinates for a current location for the shoe as indicated by a GPS receiver embedded within the shoe. The map data may include environmental condition information indicating that the GPS coordinates correspond to a street, sidewalk, inside of a building, in a park, on a beach, on a hiking trail, or some other type of environmental information or condition. The embedded control device (114), to determine the second setting, may then access a stored table that maps different types of environmental conditions, including terrain information, with different cushioning levels appropriate for the environmental condition or terrain. The embedded control device (114) may then define the second setting in dependence upon a cushioning level mapped to the one or more of the environmental conditions. For example, if the map data indicates that a current location is a grassy field, then the second setting may be a firm cushioning level that is mapped to a grassy field environmental condition. Other changes in environmental conditions may similarly be determined, and serve as a basis for determining a new cushioning level.

While in this example, determining (302) the first setting and determining (306) the second setting is performed by the embedded control device (114) of the shoe, in some cases, a mobile device, such as mobile device (116), may be paired with the embedded control device (114), and the mobile device (116) may perform these determining steps. In other words, the mobile device (116) may determine the first setting in dependence upon one or more environmental conditions, as described above with regard to determining (302) the first setting, where the mobile device (116) further transmits instructions to the embedded control device (114) to set (304) the cushioning level. Further, the mobile device (116) may also determine the second setting in dependence upon an environmental condition change among the one or more environmental conditions, as described above with regard to determining (306) the second setting, where the mobile device (116) further transmits instructions to the embedded control device (114) to alter (308) the cushioning level.

The method of FIG. 3 also includes altering (308), in dependence upon the environmental condition change, the cushioning level for the cushioning material in accordance with the second setting (352). Altering (308) the cushioning level may be carried out by the embedded control device (114) setting the cushioning level for the cushioning material in accordance with the second setting (352). Setting the cushioning level for the cushioning material for the second setting may be carried out as described above for setting (304) the cushioning level for the cushioning material for the first setting.

In this way, the dynamic footwear cushioning system may be comfortable for a user over a run across different terrains by setting different cushioning levels for a shoe in response to determined environmental conditions—whether determined by the embedded control device (114) or determined by a paired mobile device (116)—as a user moves through different types of environments as the user.

Figure 4:
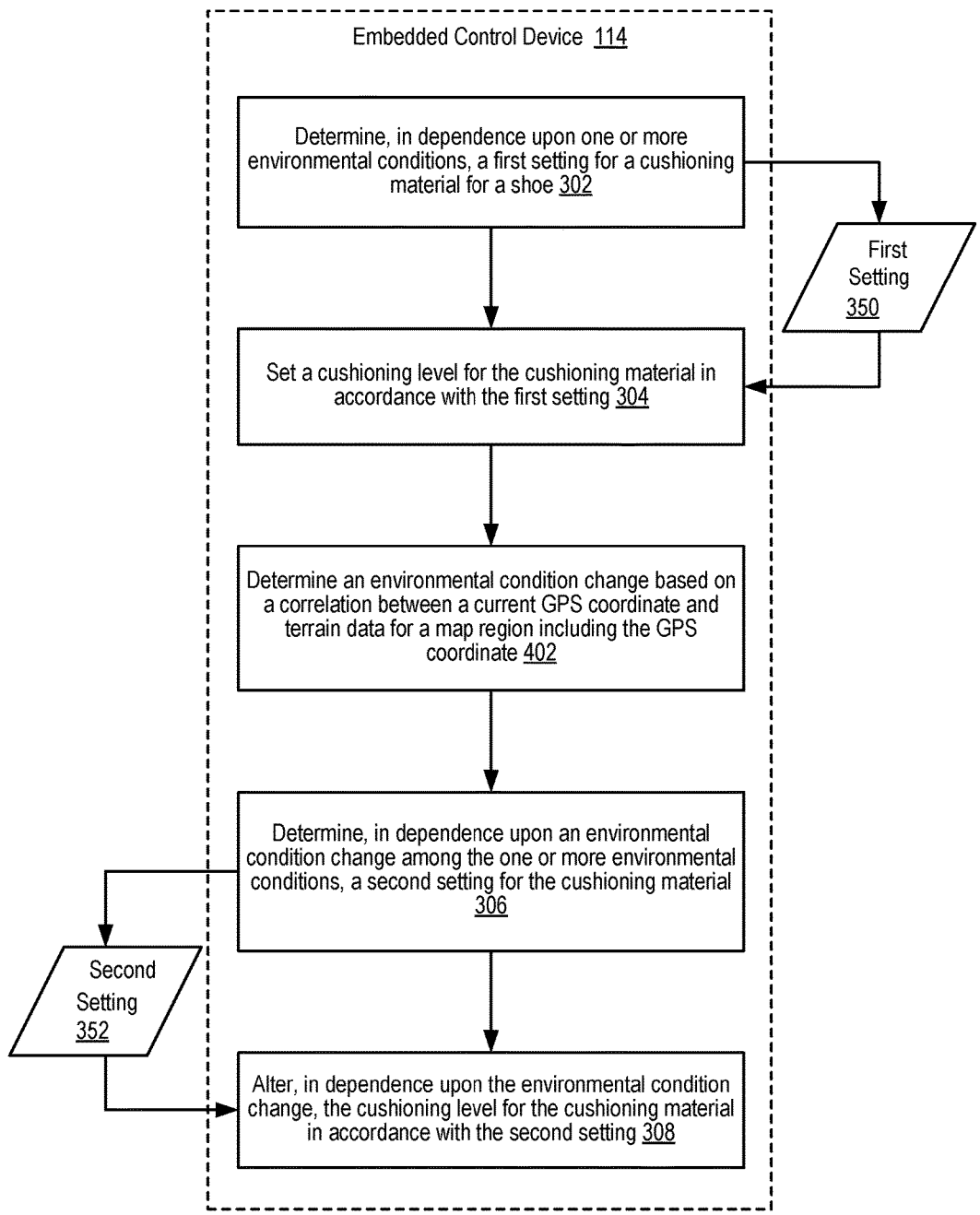
FIG. 4 depicts a flow chart illustrating another embodiment of a method for a dynamic footwear cushioning system according to an embodiment.

For further explanation, FIG. 4 depicts a flow chart illustrating an embodiment of a method for a dynamic footwear cushioning system. The dynamic footwear cushioning system may be carried out by the embedded control device (114) of footwear (110), where the embedded control device (114) includes a computer system (104) implementing a dynamic response module (130) that may be configured for the dynamic footwear cushioning system.

The method of FIG. 4 is similar to the method of FIG. 3 in that the method of FIG. 4 also includes: determining (302), in dependence upon one or more environmental conditions, a first setting (350) for a cushioning material for a shoe; setting (304) a cushioning level for the cushioning material in accordance with the first setting; determining (306), in dependence upon an environmental condition change among the one or more environmental conditions, a second setting (352) for the cushioning material; and setting (308) the cushioning level for the cushioning material in accordance with the second setting (352).

The method of FIG. 4 differs from the method of FIG. 3, however, in that the method of FIG. 4 further includes: determining (402) an environmental condition change based on a correlation between a current GPS coordinate and terrain data for a map region including the GPS coordinate.

Determining (402) the environmental condition change may be carried out by the embedded control device (114)—after determining the first setting—periodically, or aperiodically, requesting map data from a server, where the request from the embedded control device (114) include GPS coordinates for a current location for the shoe as indicated by a GPS receiver embedded within the shoe, or as indicated by a GPS receiver within a mobile device (116) in communication with the shoe. The map data may include environmental condition information indicating that the GPS coordinates correspond to a street, sidewalk, inside of a building, in a park, on a beach, on a hiking trail, or some other type of environmental information or condition.

The embedded control device (114) may then compare the terrain type for the current location with the terrain type of the location corresponding to the first setting to determine whether the terrain type has changed. For example, terrain data indicating a hard surface corresponds to a soft cushioning level for the cushioning material, and wherein terrain data indicating a soft surface corresponds to a firm cushioning level for the cushioning material.

In other examples, a change in environmental conditions may be based on any difference within the map data for the current location, such as a change in incline, elevation, or any other environmental condition change.

In this way, the embedded control device (114) enables the dynamic footwear cushioning system to dynamically adjust a current cushioning level for the cushioning material that is appropriate to a current environmental condition.

Figure 5:
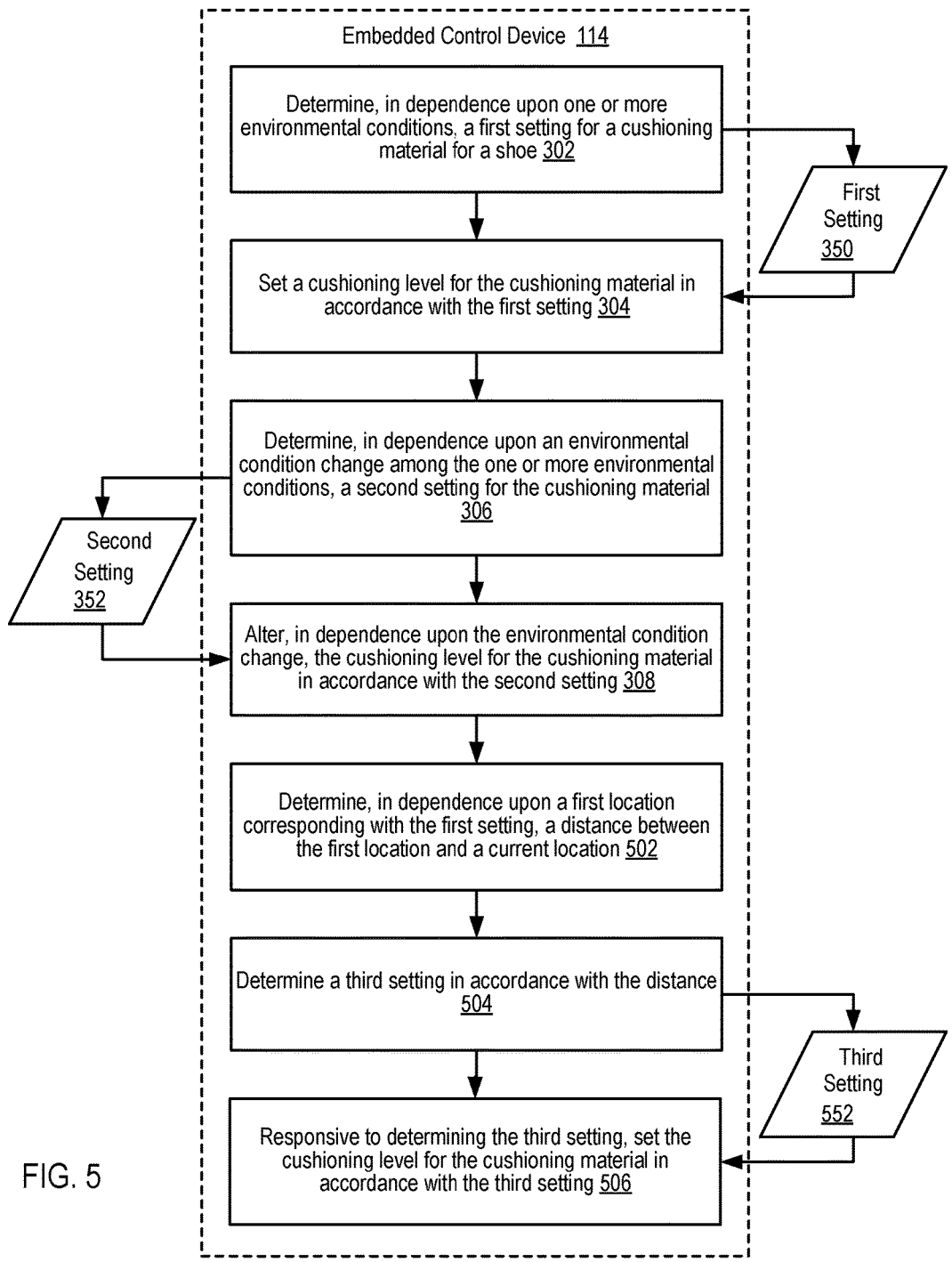
FIG. 5 depicts a flow chart illustrating another embodiment of a method for a dynamic footwear cushioning system according to an embodiment.

For further explanation, FIG. 5 depicts a flow chart illustrating an embodiment of a method for a dynamic footwear cushioning system. The dynamic footwear cushioning system may be carried out by the embedded control device (114) of footwear (110), where the embedded control device (114) includes a computer system (104) implementing a dynamic response module (130) that may be configured for the dynamic footwear cushioning system.

The method of FIG. 5 is similar to the method of FIG. 3 in that the method of FIG. 5 also includes: determining (302), in dependence upon one or more environmental conditions, a first setting (350) for a cushioning material for a shoe; setting (304) a cushioning level for the cushioning material in accordance with the first setting; determining (306), in dependence upon an environmental condition change among the one or more environmental conditions, a second setting (352) for the cushioning material; and setting (308) the cushioning level for the cushioning material in accordance with the second setting (352).

The method of FIG. 5 differs from the method of FIG. 3, however, in that the method of FIG. 5 further includes: determining (502), in dependence upon a first location corresponding with the first setting, a distance between the first location and a current location; determining (504) a third setting (552) in accordance with the distance; and responsive to determining (504) the third setting, setting (506) the cushioning level for the cushioning material in accordance with the third setting.

Determining (502) a distance may be carried out by the embedded control device (114) calculating a distance based on a different between the first location corresponding to the first setting described above at (302) and the GPS coordinates for the current location. For example, the difference between the first location may be determined based on a route that has been traversed by the shoe in moving from the first location to the current location, where the route may include various lengths along the route, where the route may include straight distances, curved distances, and turns.

In this way, the embedded control device may determine a route distance that is the distance traversed from the first location to the current location. Further, the embedded control device (114), to determine the third setting, may access stored mapping information that maps cushioning levels to distances, as discussed above in regard to FIG. 3. For example, the mapping information for various distances may specify that after 1 mile has been traversed, that a cushioning level should be set to medium, that after 5 miles have been traversed, that a cushioning level should be set to medium soft, and so on. Generally, the mapping information may specify particular cushioning levels for particular distances traversed.

Setting (506) the cushioning level for the cushioning material in accordance with the third setting may be carried out by the embedded control device (114) as described above with regard to setting (308) the cushioning level for the cushioning material in accordance with the second setting.

In this way, the dynamic footwear cushioning system may be comfortable for a user over a run across different distances by setting different cushioning levels for a shoe in response to determined distances traveled along a route.

Figure 6:
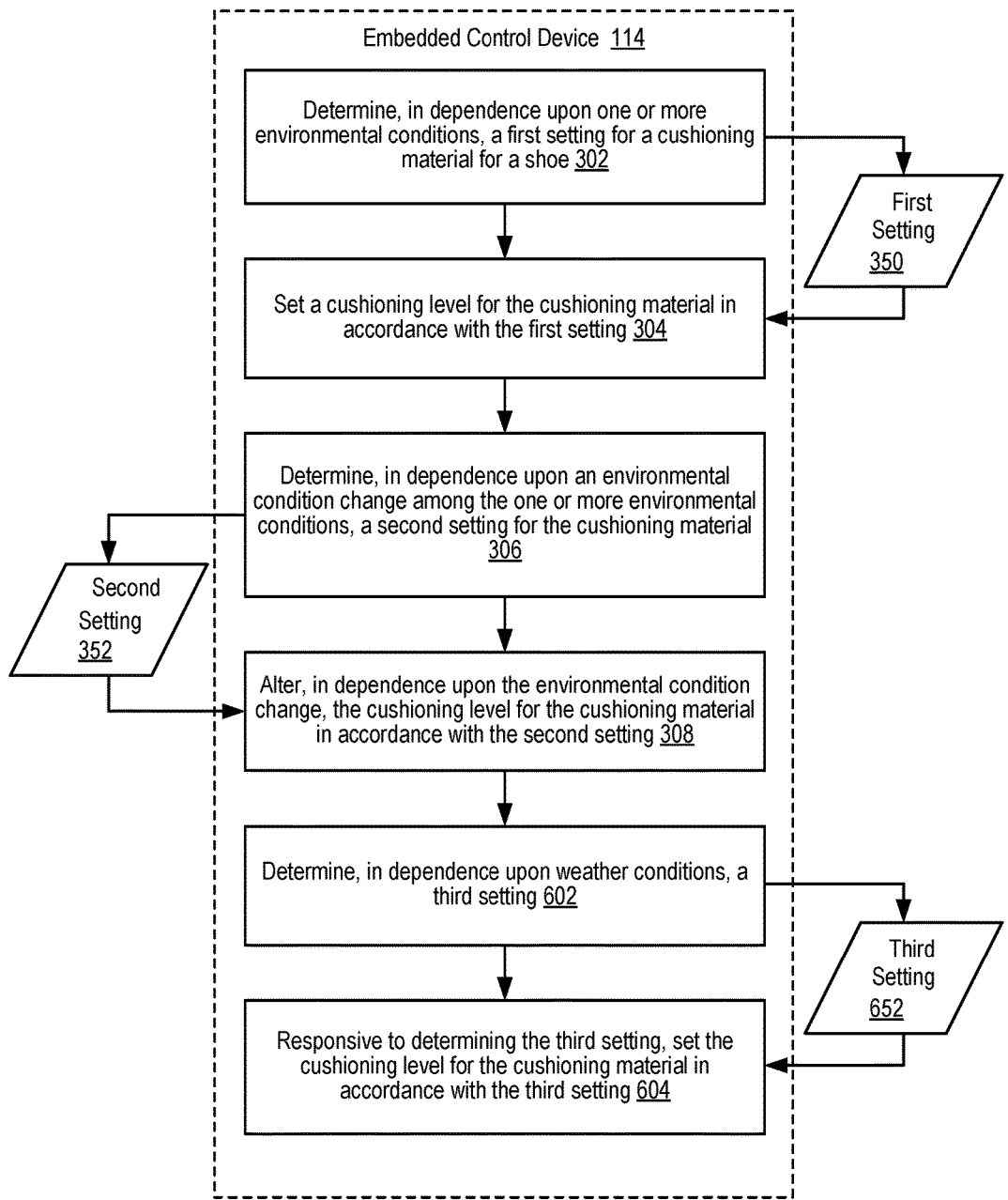
FIG. 6 depicts a flow chart illustrating another embodiment of a method for a dynamic footwear cushioning system according to an embodiment.

For further explanation, FIG. 6 depicts a flow chart illustrating an embodiment of a method for a dynamic footwear cushioning system. The dynamic footwear cushioning system may be carried out by the embedded control device (114) of footwear (110), where the embedded control device (114) includes a computer system (104) implementing a dynamic response module (130) that may be configured for the dynamic footwear cushioning system.

The method of FIG. 6 is similar to the method of FIG. 3 in that the method of FIG. 6 also includes: determining (302), in dependence upon one or more environmental conditions, a first setting (350) for a cushioning material for a shoe; setting (304) a cushioning level for the cushioning material in accordance with the first setting; determining (306), in dependence upon an environmental condition change among the one or more environmental conditions, a second setting (352) for the cushioning material; and setting (308) the cushioning level for the cushioning material in accordance with the second setting (352).

The method of FIG. 6 differs from the method of FIG. 3, however, in that the method of FIG. 6 further includes: determining (602), in dependence upon weather conditions, a third setting (652); and responsive to determining the third setting (652), setting (604) the cushioning level for the cushioning material in accordance with the third setting.

Determining (602) the third setting may be carried out by the embedded control device (114) sending a request that is transmitted to a server, where the request indicates a current GPS coordinate, and where the server responds to the request with weather information. The weather information may include humidity, barometric pressure, temperature, and other atmospheric information. The embedded control device (114), to determine the third setting, may access stored weather mapping information that maps different types of atmospheric conditions with different cushioning levels appropriate for the atmospheric condition or conditions. For example, the weather mapping information may map a high temperature with a high level of firmness for the cushioning level, map a low temperature with a low level of firmness for the cushioning level, and so on.

Setting (604) the cushioning level for the cushioning material in accordance with the third setting may be carried out by the embedded control device (114) as described above with regard to setting (308) the cushioning level for the cushioning material in accordance with the second setting.

In this way, the dynamic footwear cushioning system may be comfortable for a user over a run or walk that spans different atmospheric conditions by setting different cushioning levels for a shoe in response to determined atmospheric conditions.

Figure 7:
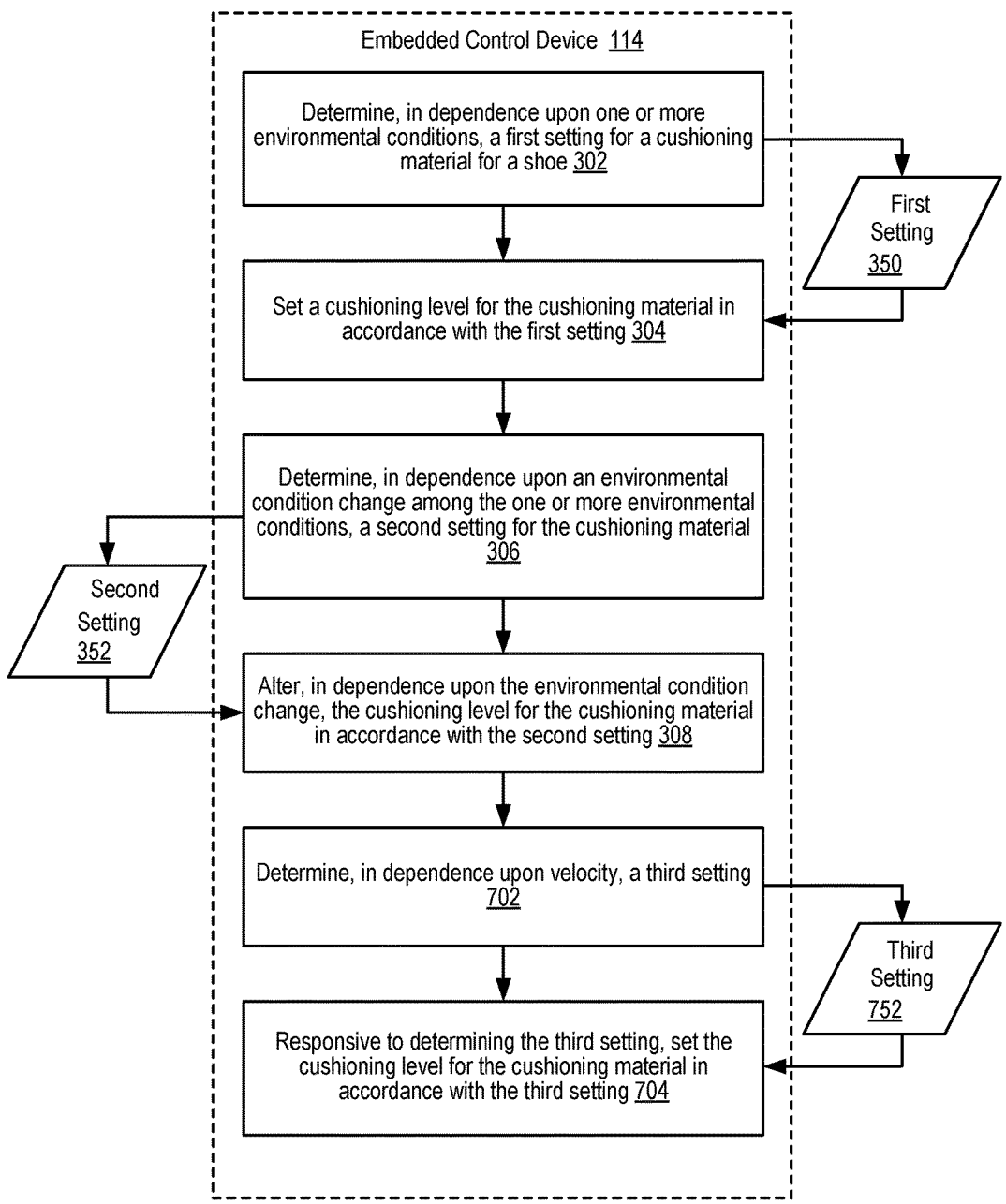
FIG. 7 depicts a flow chart illustrating another embodiment of a method for a dynamic footwear cushioning system according to an embodiment.

For further explanation, FIG. 7 depicts a flow chart illustrating an embodiment of a method for a dynamic footwear cushioning system. The dynamic footwear cushioning system may be carried out by the embedded control device (114) of footwear (110), where the embedded control device (114) includes a computer system (104) implementing a dynamic response module (130) that may be configured for the dynamic footwear cushioning system.

The method of FIG. 7 is similar to the method of FIG. 3 in that the method of FIG. 7 also includes: determining (302), in dependence upon one or more environmental conditions, a first setting (350) for a cushioning material for a shoe; setting (304) a cushioning level for the cushioning material in accordance with the first setting; determining (306), in dependence upon an environmental condition change among the one or more environmental conditions, a second setting (352) for the cushioning material; and setting (308) the cushioning level for the cushioning material in accordance with the second setting (352).

The method of FIG. 7 differs from the method of FIG. 3, however, in that the method of FIG. 7 further includes: determining (702), in dependence upon velocity, a third setting (752); and responsive to determining the third setting (752), setting (704) the cushioning level for the cushioning material in accordance with the third setting.

Determining (702) the third setting may be carried out by the embedded control device (114) calculating a distance based on a different between the first location corresponding to the first setting described above at (302) and the GPS coordinates for the current location, and calculating an interval of time corresponding to the distance, and calculating the velocity as the distance divided by the interval of time. Further, the embedded control device (114) may determine the third setting by accessing stored velocity mapping information that maps cushioning levels to different velocities. For example, the velocity mapping information may map a high velocity with a high level of firmness for the cushioning level, map a low velocity with a low level of firmness for the cushioning level, and so on.

Setting (704) the cushioning level for the cushioning material in accordance with the third setting may be carried out by the embedded control device (114) as described above with regard to setting (308) the cushioning level for the cushioning material in accordance with the second setting.

In this way, the dynamic footwear cushioning system may be comfortable for a user as the user moves at different velocities by setting different cushioning levels for a shoe in response to a determined velocity.

Figure 8:
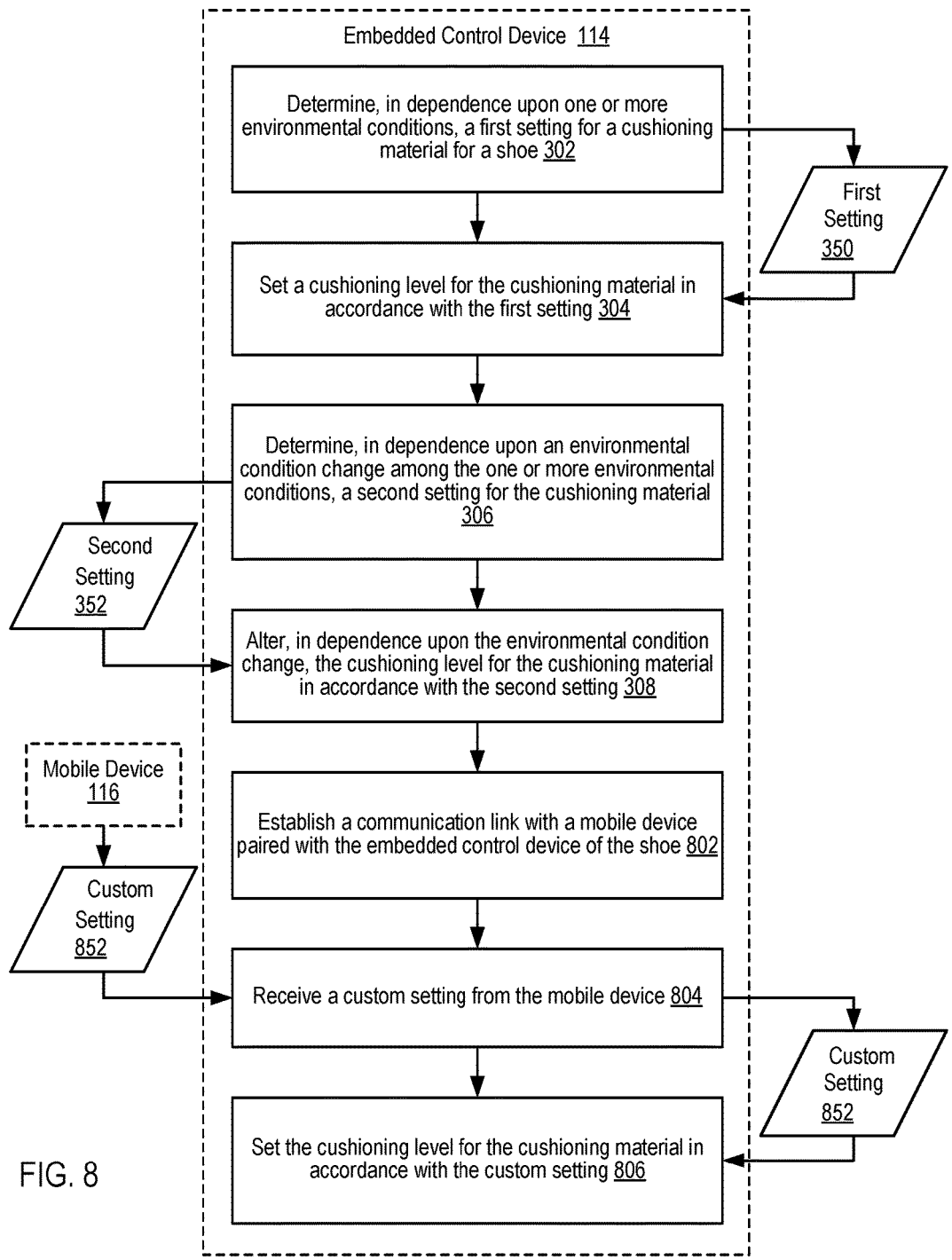
FIG. 8 depicts a flow chart illustrating another embodiment of a method for a dynamic footwear cushioning system according to an embodiment.

For further explanation, FIG. 8 depicts a flow chart illustrating an embodiment of a method for a dynamic footwear cushioning system. The dynamic footwear cushioning system may be carried out by the embedded control device (114) of footwear (110), where the embedded control device (114) includes a computer system (104) implementing a dynamic response module (130) that may be configured for the dynamic footwear cushioning system.

The method of FIG. 8 is similar to the method of FIG. 3 in that the method of FIG. 8 also includes: determining (302), in dependence upon one or more environmental conditions, a first setting (350) for a cushioning material for a shoe; setting (304) a cushioning level for the cushioning material in accordance with the first setting; determining (306), in dependence upon an environmental condition change among the one or more environmental conditions, a second setting (352) for the cushioning material; and setting (308) the cushioning level for the cushioning material in accordance with the second setting (352).

The method of FIG. 8 differs from the method of FIG. 3, however, in that the method of FIG. 8 further includes: establishing (802) a communication link with a mobile device (116) paired with the embedded control device (114) of the shoe; receiving (804) a custom setting (852) from the mobile device (116); and setting (806) the cushioning level for the cushioning material in accordance with the custom setting (852).

Establishing (802) the communication link with the mobile device (116) paired with the embedded control device (114) may be carried out by the user installing application software on the mobile device (114), where the application allows the user to detect the wireless presence of the embedded control device (114) of the shoe, and select the embedded control device (114) to pair with the application. For example, the embedded control device (114) may broadcast a Bluetooth™ device name that may be visible to the software application, where the software application may be a software application as discussed above with regard to FIG. 2.

Receiving (804) the custom setting (852) from the mobile device (116) may be carried out by the embedded control device (114) receiving a transmission from the mobile device (116) on the established communication link to the mobile device (116), where the transmission includes information specifying a cushioning level, among other possible adjustable features of the shoe. For example, a user may enter a setting in the user interface described above with regard to FIG. 3 indicating that when traveling on terrain that is concrete, that a firmness level of cushioning is set to "firm," or some other specified cushioning level corresponding to some other environmental condition, or distance, or time, or some other custom condition that may be detectable by the dynamic footwear cushioning system.

Setting (806) the cushioning level for the cushioning material in accordance with the custom setting may be carried out by the embedded control device (114) as described above with regard to setting (308) the cushioning level for the cushioning material in accordance with the second setting.

In this way, the dynamic footwear cushioning system may respond in a customized manner to different conditions by allowing a user to set different cushioning levels for a shoe.

The disclosed embodiments are described largely in the context of a fully functional computer system for a dynamic footwear cushioning system. Readers of skill in the art will recognize, however, that the disclosed embodiments may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the disclosed methods as embodied in a computer program product. Persons skilled in the art will recognize also that, although some of the embodiments described in this specification are oriented to software installed and executing on computer hardware, nevertheless, alternative embodiments implemented as firmware or as hardware are well within the scope of the present disclosure.

The disclosed embodiments for dynamic footwear cushioning system may be a system, a method, and/or a computer program product. The computer program product may include a computer readable storage medium (or media) having computer readable program instructions thereon for causing a processor to carry out features and aspects of the disclosed embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the disclosed embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In an embodiment, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform features and aspects of the disclosed embodiments.

The disclosed embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present disclosure is limited only by the language of the following claims.

What is claimed is:

1. A method comprising:
by computer program instructions executing on an embedded control device of a shoe:
setting a cushioning level for cushioning material in accordance with a first setting;
altering, in dependence upon an environmental condition change, the cushioning level for the cushioning material in accordance with a second setting;
determining, in dependence upon a first location corresponding with the first setting, a distance between the first location and a current location;
determining a third setting in accordance with the distance; and
responsive to determining the third setting, setting the cushioning level for the cushioning material in accordance with the third setting.

2. The method of claim 1, further comprising:
determining, by the embedded control device and in dependence upon one or more environmental conditions, the first setting for the cushioning material for the shoe; and
determining, by the embedded control device and in dependence upon the environmental condition change, the second setting for the cushioning material;
wherein terrain data indicating a hard surface corresponds to a soft cushioning level for the cushioning material, and wherein terrain data indicating a soft surface corresponds to a firm cushioning level for the cushioning material.

3. The method of claim 2,
wherein setting the cushioning level comprises receiving, from a mobile device paired with the embedded control device, the first setting determined in dependence upon one or more environmental conditions; and
wherein altering the cushioning level comprises receiving, from the mobile device paired with the embedded control device, the second setting determined in dependence upon the environmental condition change.

4. An apparatus comprising a computer processor, a non-transitory computer memory operatively coupled to the computer processor, the non-transitory computer memory having disposed within it computer program instructions that, when executed by the computer processor, cause the apparatus to carry out the steps of:
setting a cushioning level for cushioning material in accordance with a first setting;
altering, in dependence upon an environmental condition change, the cushioning level for the cushioning material in accordance with a second setting;
determining, in dependence upon a first location corresponding with the first setting, a distance between the first location and a current location;
determining a third setting in accordance with the distance; and
responsive to determining the third setting, setting the cushioning level for the cushioning material in accordance with the third setting.

5. The apparatus of claim 4, wherein the steps further comprise:
determining, by the embedded control device and in dependence upon one or more environmental conditions, the first setting for the cushioning material for the shoe; and
determining, by the embedded control device and in dependence upon the environmental condition change, the second setting for the cushioning material;
wherein terrain data indicating a hard surface corresponds to a soft cushioning level for the cushioning material, and wherein terrain data indicating a soft surface corresponds to a firm cushioning level for the cushioning material.

6. The apparatus of claim 5,
wherein setting the cushioning level comprises receiving, from a mobile device paired with the embedded control device, the first setting determined in dependence upon one or more environmental conditions; and
wherein altering the cushioning level comprises receiving, from the mobile device paired with the embedded control device, the second setting determined in dependence upon the environmental condition change.

7. A shoe comprising a computer program product disposed upon a non-transitory, computer-readable medium, the computer program product comprising computer program instructions that, when executed, cause a computer to carry out the steps of:
setting a cushioning level for cushioning material in accordance with a first setting;
altering, in dependence upon an environmental condition change, the cushioning level for the cushioning material in accordance with a second setting;
determining, in dependence upon a first location corresponding with the first setting, a distance between the first location and a current location;
determining a third setting in accordance with the distance; and
responsive to determining the third setting, setting the cushioning level for the cushioning material in accordance with the third setting.

8. The shoe comprising the computer program product of claim 7, wherein the steps further comprise:

determining, by the embedded control device and in dependence upon one or more environmental conditions, the first setting for the cushioning material for the shoe; and determining, by the embedded control device and in dependence upon the environmental condition change, the second setting for the cushioning material;

wherein terrain data indicating a hard surface corresponds to a soft cushioning level for the cushioning material, and wherein terrain data indicating a soft surface corresponds to a firm cushioning level for the cushioning material.

9. The shoe comprising the computer program product of claim 8, wherein setting the cushioning level comprises receiving, from a mobile device paired with the embedded control device, the first setting determined in dependence upon one or more environmental conditions; and wherein altering the cushioning level comprises receiving, from the mobile device paired with the embedded control device, the second setting determined in dependence upon the environmental condition change.

* * * * *